(12) United States Patent
Lin et al.

(10) Patent No.: US 12,102,503 B2
(45) Date of Patent: Oct. 1, 2024

(54) STRUCTURALLY RELIABLE BRACKET

(71) Applicant: ZHEJIANG SHINYE MEDICAL TECHNOLOGY CORP., LTD., Hangzhou (CN)

(72) Inventors: Quanhong Lin, Hangzhou (CN); Wangfeng Zhou, Hangzhou (CN)

(73) Assignee: ZHEJIANG SHINYE MEDICAL TECHNOLOGY CORP., LTD., Hangzhou (CN)

( * ) Notice: Subject to any disclaimer, the term of this patent is extended or adjusted under 35 U.S.C. 154(b) by 339 days.

(21) Appl. No.: 17/585,553

(22) Filed: Jan. 27, 2022

(65) Prior Publication Data
US 2022/0142744 A1    May 12, 2022

Related U.S. Application Data

(63) Continuation of application No. PCT/CN2020/104482, filed on Jul. 24, 2020.

(30) Foreign Application Priority Data

Jul. 31, 2019    (CN) .......................... 201910700478.8

(51) Int. Cl.
*A61C 7/28*    (2006.01)
(52) U.S. Cl.
CPC .................................. *A61C 7/287* (2013.01)
(58) Field of Classification Search
CPC ............. A61C 7/14; A61C 7/28; A61C 7/287
See application file for complete search history.

(56) References Cited

U.S. PATENT DOCUMENTS

| | | | | |
|---|---|---|---|---|
| 5,322,435 A * | 6/1994 | Pletcher | .............. | A61C 7/145 433/10 |
| 5,466,151 A * | 11/1995 | Damon | .............. | A61C 7/287 433/10 |
| 7,963,767 B2 * | 6/2011 | Lewis | .............. | A61C 7/287 433/10 |
| 8,033,824 B2 * | 10/2011 | Oda | .............. | A61C 7/146 433/10 |

(Continued)

FOREIGN PATENT DOCUMENTS

| CN | 205626154 U | 10/2016 |
|---|---|---|
| CN | 107714205 A | 2/2018 |

(Continued)

OTHER PUBLICATIONS

International Search Report of PCT/CN2020/104482.

*Primary Examiner* — Ralph A Lewis

(57) ABSTRACT

A structurally reliable bracket, comprising a base bracket provided with an arch wire slot, a net base fixed on one side of the base bracket, and a cover plate mounted on the other side of the base bracket; a bottom surface of the cover plate and a top surface of the base bracket abuts against each other and is in sliding fit; a strip-shaped elastic member is mounted on the top surface of the base bracket, two clamping slots are sequentially disposed on a bottom surface of the cover plate along a sliding direction of the cover plate, and a transition ridge protruding towards the direction of the base bracket is provided between the two clamping slots; and a part of the elastic member is a working section, and an avoiding slot is further provided on the top surface of the base bracket.

7 Claims, 7 Drawing Sheets

(56) References Cited

U.S. PATENT DOCUMENTS

| | | | | |
|---|---|---|---|---|
| 9,532,853 B2* | 1/2017 | Huang | ............... | A61C 7/287 |
| 9,730,770 B2* | 8/2017 | Yick | ............... | A61C 7/287 |
| 10,111,732 B2* | 10/2018 | Sommer | ............... | A61C 7/287 |
| 2014/0127638 A1* | 5/2014 | Huang | ............... | A61C 7/34 |
| | | | | 433/11 |
| 2014/0272752 A1* | 9/2014 | Huang | ............... | A61C 7/30 |
| | | | | 433/11 |
| 2016/0175073 A1* | 6/2016 | Huang | ............... | A61C 7/285 |
| | | | | 433/11 |
| 2019/0117340 A1* | 4/2019 | Oh | ............... | A61C 7/287 |
| 2019/0175306 A1* | 6/2019 | Lai | ............... | A61C 7/287 |
| 2020/0390525 A1* | 12/2020 | Chen | ............... | A61C 7/14 |

FOREIGN PATENT DOCUMENTS

| | | |
|---|---|---|
| CN | 208838198 U | 5/2019 |
| CN | 110478062 A | 11/2019 |

* cited by examiner

STRUCTURALLY RELIABLE BRACKET

CROSS-REFERENCE TO RELATED APPLICATION

This application is a continuation of National Stage application of International Application No. PCT/CN2020/104482 filed on Jul. 24, 2020, which claims all benefits accruing from China Patent Application No. 201910700478.8, filed on Jul. 31, 2019, and titled "STRUCTURALLY RELIABLE BRACKET" in the China National Intellectual Property Administration, both of which are hereby incorporated by reference.

TECHNICAL FIELD

The present disclosure relates to the field of orthodontics, in particular to a structurally reliable bracket.

BACKGROUND

A bracket is an important component of fixed orthodontic technology, which is directly bonded to a surface of a dental crown with an adhesive. An arch-wire applies various types of orthodontic forces to teeth via the bracket. The bracket can be made of a stainless steel, a bioceramic or a composite resin. The bracket is mainly used to fix the arch-wire, to facilitate the arch-wire play a better role and transmit an orthodontic force. Thus, a three-dimensional movement of the teeth can be controlled and a purpose of orthodontic correction can be achieved.

With the development of metallurgical industry and machinery industry, stainless steel is gradually used in bracket series. Form 1940s, stainless steel has been used for preparing third-generation square arch-wire brackets. Especially after the World War II, stainless steel quickly replaced noble metals and became the mainstream of fixed orthodontic materials due to its excellent mechanical properties (such as higher hardness, lower friction resistance of wire slot and low price, etc.). At present, a stainless steel bracket is still the most widely used bracket for fixed orthodontic in clinic. However, the bracket made of the stainless steel and other materials have obvious color difference with a color of human teeth. For fixed orthodontic techniques with a long treatment process, appearance defects of stainless steel bracket are very prominent.

Therefore, a ceramic bracket has also appeared on the market. The ceramic bracket was invented in 1986 and quickly became an alternative to a plastic bracket. Raw materials for making the ceramic bracket are mainly aluminum oxide and zinc oxide, and aluminum oxide is more widely used. An appearance of the ceramic bracket is also satisfactory. A white ceramic bracket, a tooth-colored ceramic bracket and a translucent ceramic bracket can be produced by controlling compositions and processing technology of the ceramic. If the ceramic bracket is combined with arch-wires made of fiberglass, the appearance can be more desirable. The ceramic bracket also has mechanical properties such as good biocompatibility, good tensile strength and good bonding strength with enamel, which are significantly better than the stainless steel bracket.

However, the inventor found that it was relatively complicated to install whether a metal bracket or the ceramic bracket on a cover plate. In conventional art, many self-locking brackets adopt a method of inserting the cover plate into the bracket first, and then installing a locking piece from a reverse side, ensuring that the cover plate will not fall off during a process of opening and closing the cover. With this structure, after the locking piece and the bracket are both installed, the cover plate can be directly pushed in to complete the assembly. This structure can ensure that the cover plate will not fall off after the cover sheet is pushed in. However, the technical solution in the conventional art is that it is complicated to install the cover sheet, and slow to assemble with a high cost. In addition, an assembling process is invisible.

SUMMARY

The present disclosure provides a structural reliable bracket, which includes a base bracket provided with an arch-wire slot, a net base fixed on a first side of the base bracket, and a cover plate mounted on a second side of the base bracket. A bottom surface of the cover plate and a top surface of the base bracket abut against each other and are in sliding fit. A strip-shaped elastic member is mounted on the top surface of the base bracket. A first clamping slot and a second clamping slot are sequentially disposed on the bottom surface of the cover plate along a sliding direction of the cover plate, and a transition ridge protruding towards the base bracket is provided between the two clamping slots; and the elastic member includes two working sections, when the cover plate slides, the working sections enters a corresponding one of a first clamping slot and a second clamping slot via the transition ridge respectively, and an adjusting slot is further provided on the top surface of the base bracket to accommodate a deformation part of the working section when abutting against the transition ridge.

The present disclosure further provides a plurality of optional manners hereinafter, which are not intended to be additional limitations on the above-mentioned general solution, but are merely further additions or optimizations. On a premise that there is no technical or logical contradiction, each optional manner may be combined individually for the above-mentioned overall solution, or may be combined among multiple optional manners.

In some embodiments, the top surface of the base bracket is provided with a mounting slot. The elastic member is accommodated in the mounting slot, and the adjusting slot is disposed below the mounting slot and communicated with the mounting slot.

In some embodiments, the mounting slot extends along a direction parallel to edges of the top surface of the base bracket.

In some embodiments, the mounting slot and the elastic member extend along a direction perpendicular to the sliding direction of the cover plate.

In some embodiments, the adjusting slot is a blind slot; or, the adjusting slot is a through slot, and a sealing chock is fixed at a bottom of the through slot and located at the first side of the base bracket away from the cover plate.

In some embodiments, the working section is defined as a middle of the elastic member along a length direction of the elastic member, corresponding to the transition ridge. Two ends of the elastic member are defined as positioning sections. When the cover plate slides, each of the positioning sections is limited in the mounting slot.

In some embodiments, along a length direction of the elastic member, the adjusting slot is shorter than the mounting slot, and a slope is defined at a junction between the adjusting slot and the mounting slot for transition. When the working section is squeezed by the transition ridge and deforms, the working section enters the adjusting slot via the slope.

In some embodiments, the transition ridge comprises a first slope and a second slope, the bracket has an opened state and a closed state, when the bracket is in the closed state, the cover plate seals the arch-wire slot, and the first slope abuts against the elastic member, when the bracket is in the opened state, the cover plate unseal the arch-wire slot, and the second slope abuts against the elastic member; wherein, a slope gradient of the first lope is smaller than that of the second slope.

In some embodiments, the bottom surface of the cover plate is provided with a first blocking protrusion and a second blocking protrusion, which are disposed at both sides of the transition ridge along the sliding direction of the cover plate, respectively; wherein the first locking protrusion is disposed at a first side of the transition ridge towards the arch-wire slot, and the second blocking protrusion is disposed at a second side of the transition ridge away from the arch-wire slot, wherein the first clamping slot is disposed between the first blocking protrusion and the transition ridge, when the cover plate is in a sealed position, the working section of the elastic member is accommodated in the first clamping slot; wherein the second clamping slot is disposed between the second blocking protrusion and the transition ridge, when the cover plate is in an opened position, the working section of the elastic member is accommodated in the second clamping slot.

In some embodiments, along a length direction of the elastic member, a width of the first blocking protrusion, a width of the second blocking protrusion and a width of the transition ridge are same, and the adjusting slot is disposed correspondingly to the working section of the elastic member.

In the present disclosure, by cooperation between the elastic member and the transition ridge, the cover plate can be positioned at a plurality of positions. When the cover plate moves, the transition ridge squeezes the elastic member and drives the elastic member to deform, defining an energy stair. Thus, when work from the external is less than the energy stair, state of the cover plate will not change, ensuring stability of the state of the cover plate, thereby ensuring stability of state of the bracket.

Specific technical effects of the present disclosure will be illustrated in details in the embodiments.

BRIEF DESCRIPTION OF THE DRAWINGS

In order to better describe and explain the embodiments and/or examples of those disclosures disclosed herein, one or more drawings may be referred to. The additional details or examples used to describe the drawings should not be considered as limiting the scope of any of the disclosed disclosures, the currently described embodiments and/or examples, and the best mode of these disclosures currently understood.

Figure 1:
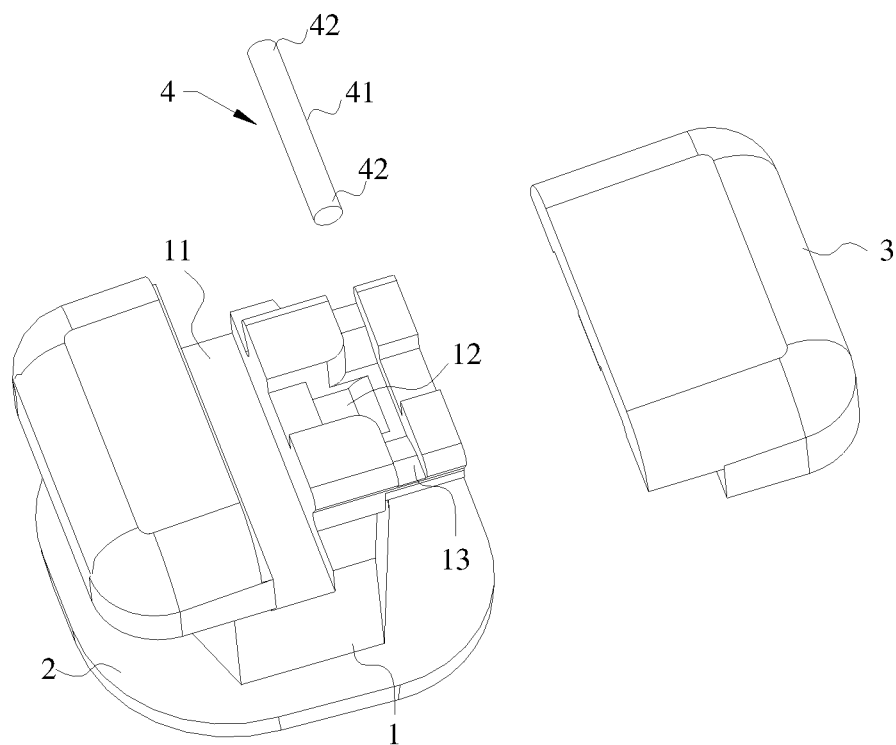
FIG. 1 is a schematic diagram of a bracket in an embodiment.
Figure 2:
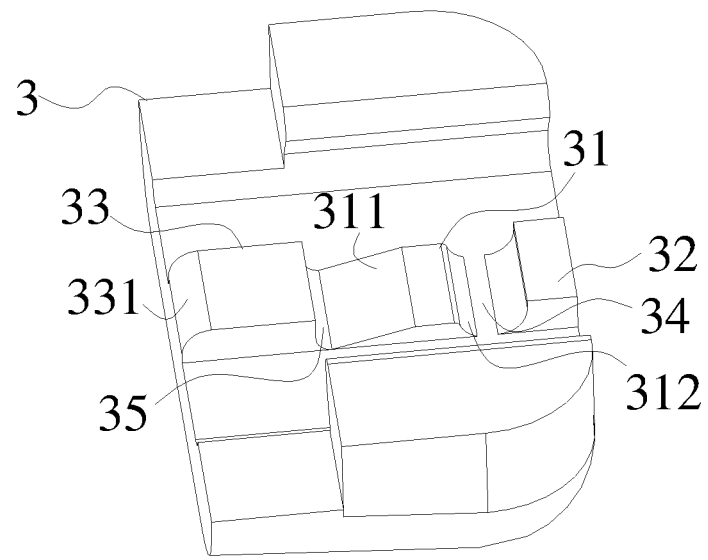
FIG. 2 is a structural schematic diagram of a bottom of a cover plate in FIG. 1.
Figure 3:
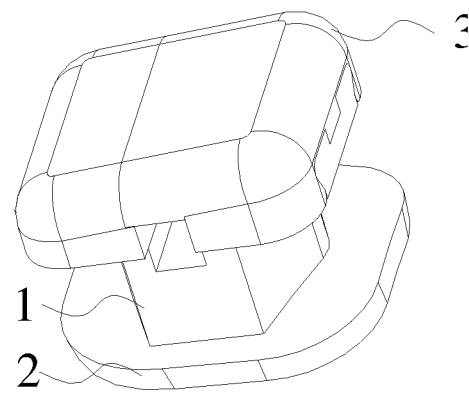
FIG. 3 is a schematic diagram of the bracket in a closed state in FIG. 1.
Figure 4:
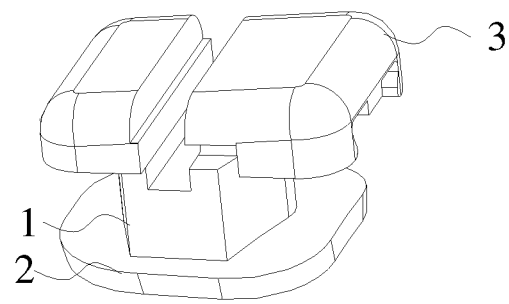
FIG. 4 is a schematic diagram of the bracket in an opened state in FIG. 1.
Figure 5:
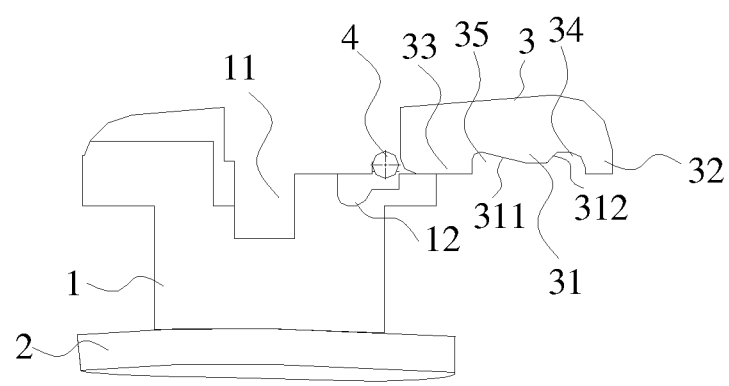
FIG. 5 is a schematic diagram showing a first stage of mounting the cover plate on the bracket in FIG. 1.
Figure 6:
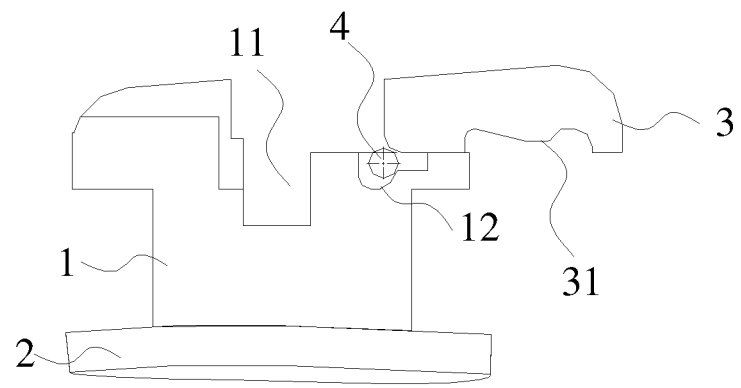
FIG. 6 is a schematic diagram showing a second stage of mounting the cover plate on the bracket in FIG. 1.
Figure 7:
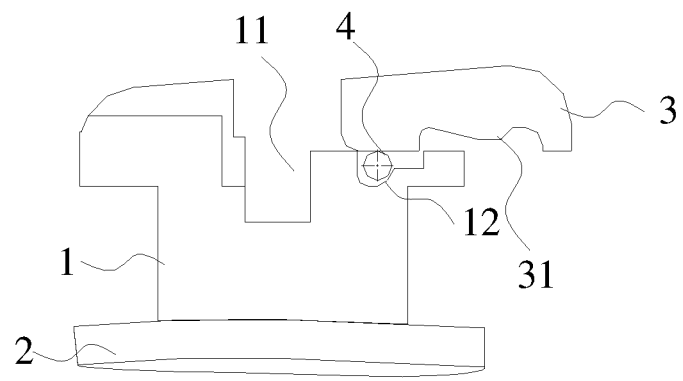
FIG. 7 is a schematic diagram showing a third stage of mounting the cover plate on the bracket in FIG. 1.
Figure 8:
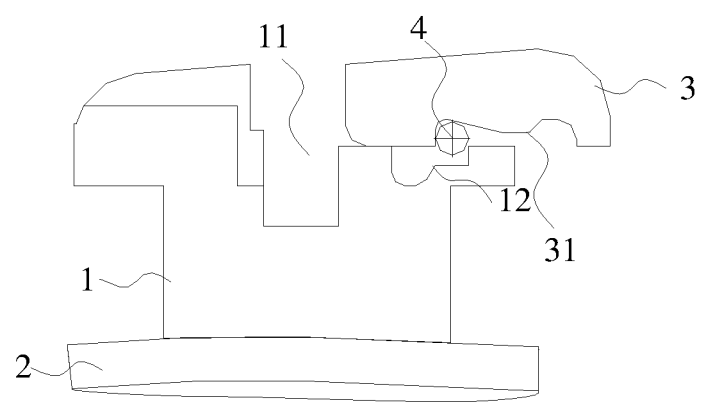
FIG. 8 is a side view of the bracket in a closed state in FIG. 1.
Figure 9:
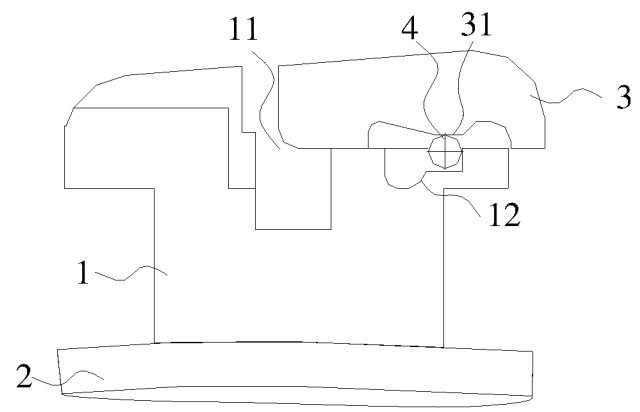
FIG. 9 is a schematic diagram showing a first stage for closing the cover plate of the bracket in FIG. 1.
Figure 10:
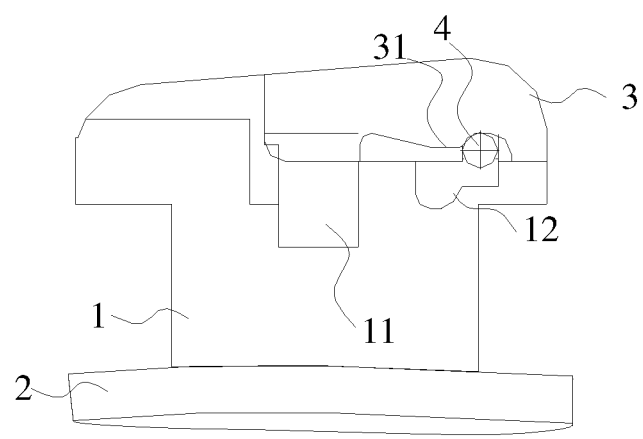
FIG. 10 is a side view of the bracket in an opened state in FIG. 1.
Figure 11:
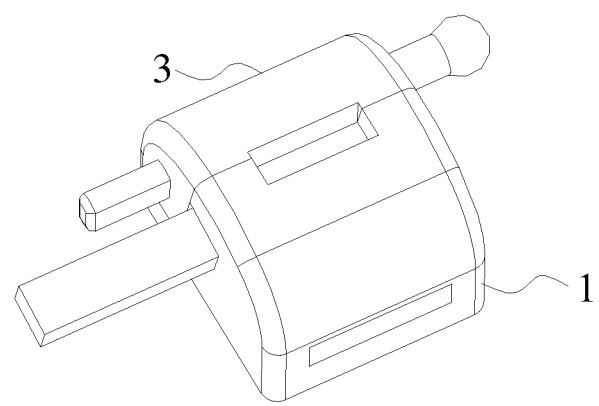
FIG. 11 is a schematic diagram of a bracket provided with an arch-wire in an embodiment.
Figure 12:
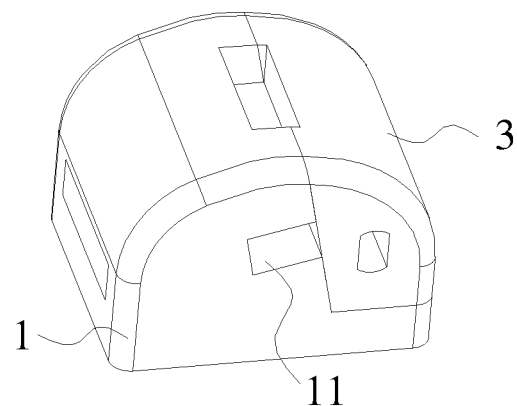
FIG. 12 is a schematic diagram of the bracket in FIG. 11 from another angle of view.
Figure 13:
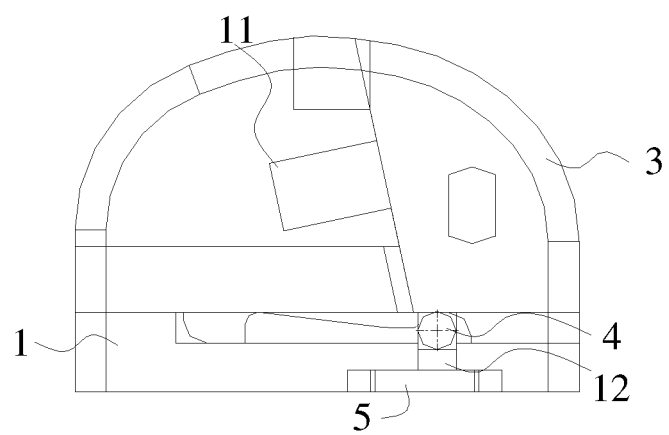
FIG. 13 is a side view of the bracket in FIG. 11.

In the figures,

1 represents a base bracket; 11 represents an arch-wire slot; 12 represents an adjusting slot; 13 represents a mounting slot; 2 represents a net base; 3 represents a cover plate; 31 represents a transition ridge; 311 represents a first slope; 312 represents a second slope; 32 represents a first blocking protrusion; 33 represents a second blocking protrusion; 331 represents an arch surface; 34 represents a first clamping slot; 35 represents a second clamping slot; 4 represents an elastic member; 41 represents a working section; 42 represents a positioning section; 5 represents a sealing chock.

DETAILED DESCRIPTION

The technical solutions in the embodiments of the present application will be clearly and completely described below with reference to the accompanying drawings in the embodiments of the present application. Obviously, the described embodiments are only a part of the embodiments of the present application, but not all of the embodiments. Based on the embodiments in the present application, all other embodiments obtained by one of ordinary skill in the art without creative efforts shall fall within the protection scope of the present application.

It should be noted that when a component is referred to as being "connected" to another component, it can be directly connected to the other component or an intervening component may also exist. When a component is considered to be "set on" another component, it may be directly set on the other component or there may be a co-existing centered component.

Unless otherwise defined, all technical and scientific terms used herein have the same meaning as commonly understood by one of ordinary skill in art. The terms used herein in the specification of the present application are for the purpose of describing specific embodiments only, and are not intended to limit the present application. As used herein, the term "and/or" includes any and all combinations of one or more of the associated listed items.

Referring to FIG. 1 to FIG. 4, and FIG. 11 to FIG. 14*b*, the present disclosure provides a structural reliable bracket, which can include a base bracket 1 provided with an arch-wire slot 11, a net base 2 fixed on a first side of the base bracket 1, and a cover plate 3 mounted on a second side of the base bracket 1.

A bottom surface of the cover plate 3 and a top surface of the base bracket 1 can abut against each other and be in sliding fit.

A strip-shaped elastic member 4 can be mounted on the top surface of the base bracket 1, two clamping slots can be sequentially disposed on the bottom surface of the cover plate 3 along a sliding direction of the cover plate 3, and a transition ridge 31 protruding towards the base bracket can be provided between the two clamping slots.

The elastic member 4 includes two working sections 41, when the cover plate 3 slides, the working section 41 can enter a corresponding slot via the transition ridge 31. An adjusting slot 12 can be further provided on the top surface of the base bracket 1 to accommodate a deformation part of the working section 41 when abutting against the transition ridge 31.

By sealing the arch-wire slot 11 with the cover plate 3, the bracket can transfer stress from the arch-wire to the teeth, thereby adjusting spatial positions of the teeth. While mounting and adjusting the arch-wire, the cover plate 3 should be opened to unseal the arch-wire slot 11, so as to facilitate operation. When the arch-wire does not need to be mounted or adjusted, the cover plate 3 can be sealed to ensure that the arch-wire is accommodated in the arch-wire slot 11, and the arch-wire can apply force on the bracket. Therefore, the cover plate 3 should have features such as easy to be mounted, self-positioning, and not easy to be accidentally moved. By cooperation between the elastic member 4 and the transition ridge 31, the cover plate 3 can be positioned at a plurality of positions. The transition ridge can protrude from the cover plate 3 to the base bracket 1. When the cover plate 3 moves, the transition ridge 31 can move along with the cover plate 3, and intervene with the elastic member 4. When the cover plate 3 moves, the transition ridge 31 can squeeze the elastic member 4 and drive the elastic member 4 to deform, defining an energy stair. Thus, when work from the external is less than the energy stair, state of the cover plate 3 will not change, ensuring stability of the state of the cover plate 3, thereby ensuring stability of state of the bracket.

Referring to FIG. 1 to FIG. 7, and FIG. 15 to FIG. 1, while the cover plate 3 moving, the transition ridge 31 not only can apply a first force on the elastic member 4 along an altitude direction of the base bracket 1, but also can apply a second force on the elastic member 4 along the sliding direction of the cover plate 3. The second force can cause the elastic member 4 to have a tendency to move along with the cover plate 3. If the tendency is not kept within limits, the elastic member 4 can move, leading to unsure position of the cover plate 3, thereby failing to position the cover plate 3. In some embodiments, the elastic member 4 can be mounted by a plurality of methods. For example, the elastic member 4 can be fixed on the base bracket 1 by methods such as pasting, welding, fastening by a fastener, and the like. In some embodiments, the top surface of the base bracket 1 can be provided with a mounting slot 13. The elastic member 4 can be accommodated in the mounting slot 13, and the adjusting slot 12 can be disposed below the mounting slot 13 and communicated with the mounting slot 13.

Compared with other implementation modes, a bracket applying the mounting slot 13 can be simple, and easy to mount, with a simple structure. Besides, the bracket applying the mounting slot 13 can have a high tolerance level to materials and characteristics of the base bracket 1 and the elastic member 4. The mounting slot 13 can be used to limit the tendency of the elastic member 4 to move along with the cover plate 3. Therefore, the mounting slot 13 can apply a force on the elastic member 4 along the sliding direction of the cover plate 3 via two side walls of the mounting slot 13. Referring to the figures, the mounting slot 13 can be divided into two parts, and two ends of the elastic member 4 can be accommodated in the two parts of the mounting slots 13, respectively. Axes of the two parts of the mounting slot 13 can be parallel to and collinear with each other. In some embodiments, the axes of two parts of the mounting slot 13 can be not limited to be parallel to or collinear with each other.

An accuracy of the mounting slot 13 can be mainly adjusted by the two side walls along the sliding direction of the cover plate 3. Side walls of the mounting slot 13 in the other directions can be defined according to actual needs. In some embodiments, the mounting slot 13 can extend along a direction parallel to edges of the top surface of the base bracket 1.

Figure 14A:
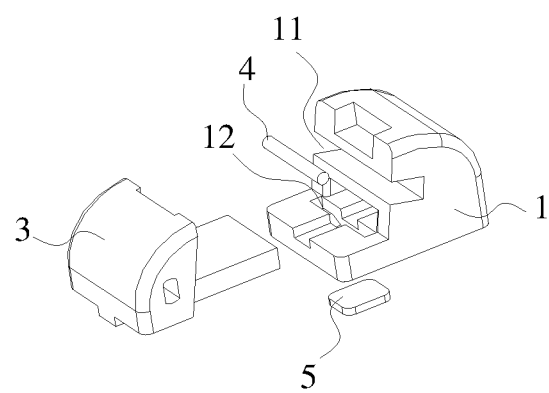
FIG. 14*a* is a schematic diagram of interior structural of the bracket in FIG. 11.
Figure 14B:
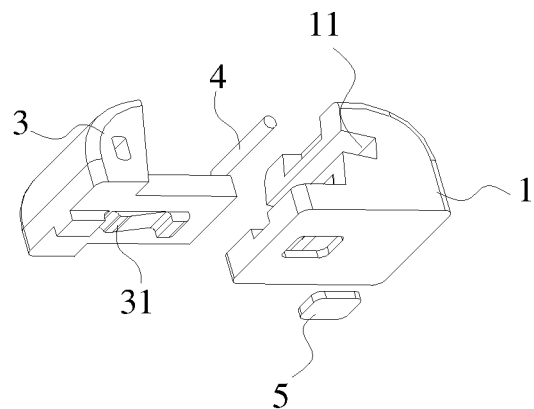
FIG. 14*b* is a schematic diagram of interior structural of the bracket in FIG. 11 from another angle of view.
Figure 15:
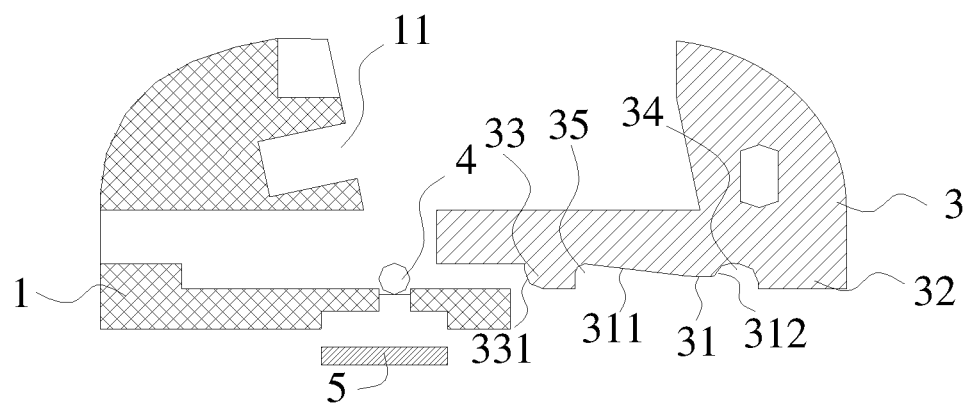
FIG. 15 is a process diagram of mounting the cover plate on the bracket in FIG. 11.
Figure 16:
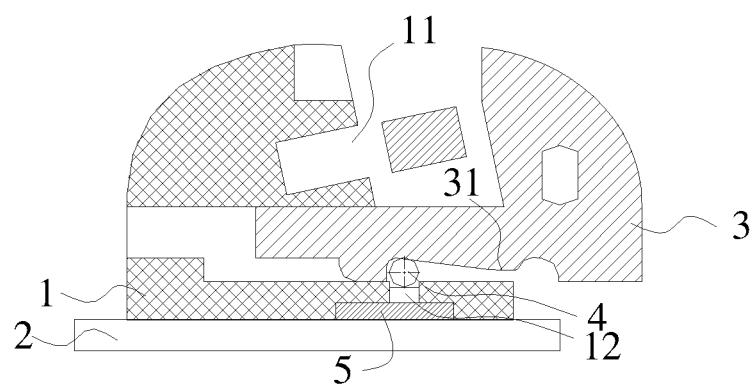
FIG. 16 is a schematic diagram of the bracket in an opened state in FIG. 11.
Figure 17:
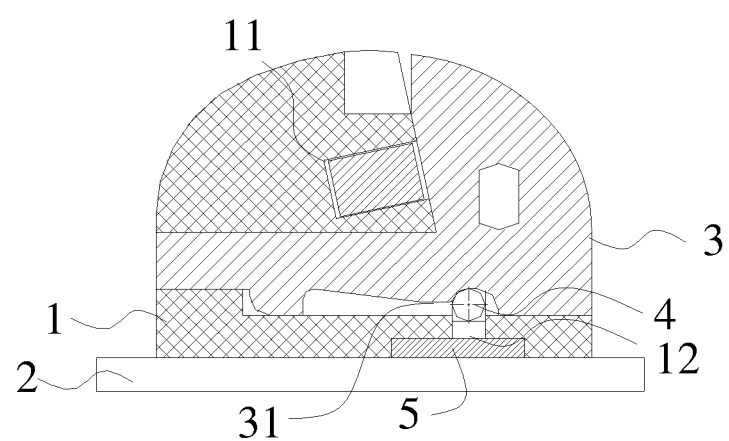
FIG. 17 is a schematic diagram of the bracket in a closed state in FIG. 11.

The mounting slot 13 extending along a direction parallel to edges of the top surface of the base bracket 1 can facilitate production and processing of the bracket. Referring to FIG. 14a, in some embodiments, the elastic member 4 can be relatively and accurately positioned, and the mounting slot 13 can be not penetrating through the top surface of the base bracket 1.

In some embodiments, the mounting slot 13 and the elastic member 4 can extend along a direction perpendicular to the sliding direction of the cover plate 3.

By designing a mounting slot 13 perpendicular to the sliding direction of the cover plate 3, a component force along the axis of the elastic member 4 of a force applied by the transition ridge 31 to the elastic member 4 can be avoided. The component force can be caused by an angle between the mounting slot 13 and the sliding direction of the cover plate 3. The component force can lead to movement of the elastic member 4 along the axis of the mounting slot 13, thereby leading to decrease of positioning accuracy or even failure of positioning.

Working state of the elastic member 4 can be adjusted and limited by the mounting slot 13 and the adjusting slot 12. In some embodiments, the adjusting slot 12 can be a blind slot. Optionally, the adjusting slot 12 can be a through slot and at a bottom of the through slot, and the sealing chock 5 can be fixed at the first side of the base bracket 1 away from the cover plate 3.

The sealing chock 5 can provide an upper limit to deformation of the elastic member 4, which can avoid abrasion or self-dismounting of the elastic member 4 caused by excessive deformation.

Effect of the elastic member 4 can be further influenced by matching between the elastic member 4 and the mounting slot 13. In some embodiments, the working section 41 can be defined as a middle part of the elastic member 4 along a length direction of the elastic member 4, corresponding to the transition ridge 31. The two ends of the elastic member 4 can be defined as positioning sections 42. When the cover plate 3 slides, each of the positioning sections 42 can be limited in the mounting slot 13.

In some embodiments, additional technical effects can be achieved by designing the matching between the mounting slot 13 and the elastic member 4. For example, by disposing the two parts of the mounting slot 13 unparallel, a preload can be provided to the elastic member 4, thereby adjusting a trigger force of the elastic member 4, or changing a driving force of the cover plate 3, etc.

Changing of a force moment while the cover plate 3 sliding can be influenced by designing of the elastic member 4, the mounting slot 13 and the adjusting slot 12. In some embodiments, along a length direction of the elastic member 4, the adjusting slot 12 can be shorter than the mounting slot 13, and a slope can be defined at a junction between the adjusting slot 12 and the mounting slot 13 for transition. When the working section is squeezed by the transition ridge 31 and deforms, the working section can enter the adjusting slot 12 via the slope.

Abrasion between the elastic member 4, the mounting slot 13 and the adjusting slot 12 can be decreased by the slope, thereby prolonging service life of the bracket. The slope can further make interaction between the transition ridge 31 and the elastic member 4 more smoothly. At the same time, in some embodiments, when the transition ridge 31 can include a first slope 311 and a second slope 312. The bracket can have an opened state and a closed state. When the bracket is in a closed state, the cover plate 3 can seal the arch-wire slot 11, and the first slope 311 can abut against the elastic member 4. When the bracket is in an opened state, the cover plate 3 can unseal the arch-wire slot 11, and the second slope 312 can abut against the elastic member 4.

A slope gradient of the first lope 311 can be smaller than that of the second slope 312.

By designing the first slope 311 and the second slope 312, the cover plate 3 can be provided with a linear driving force, which can facilitate operation of operators such as doctors. The slope gradient of the first lope 311 can be smaller than that of the second slope 312, that is, the slope gradient of the second lope 312 can be larger with a faster changing speed. When the cover plate 3 is pulled back to open the arch-wire slot 11, the second slope 312 can abut against the elastic member 4. Thus, the larger the slope gradient of the second lope 312 is, the harder the cover plate 3 can be pulled back. Thus, possibility of accidental opening of the cover plate 3 can be reduced.

Except for state change via the transition ridge 31, movement limitation of the cover plate 3 should also be limited. In some embodiments, the bottom surface of the cover plate 3 can be provided with a first blocking protrusion 32 and a second blocking protrusion 33, which are disposed at both sides of the transition ridge 31 along the sliding direction of the cover plate 3 respectively.

Wherein, the first locking protrusion 32 can be disposed at a first side of the transition ridge 31 towards the arch-wire slot 11, and the second blocking protrusion 33 can be disposed at a second side of the transition ridge 31 away from the arch-wire slot 11. The two clamping slots can include a first clamping slot 34 and a second clamping slot 35.

Wherein the first clamping slot 34 can be disposed between the first blocking protrusion 32 and the transition ridge 31, when the cover plate 3 can be in the sealed position, the working section of the elastic member 4 can be accommodated in the first clamping slot 34.

Wherein the second slot 35 can be disposed between the second blocking protrusion 33 and the transition ridge 31, when the cover plate 3 can be in the opened position, the working section of the elastic member 4 can be accommodated in the second clamping slot 35.

The first clamping slot 34 can be formed by disposing the first blocking protrusion 32 and the second slope 312 in surrounding, and the second clamping slot 35 can be actually formed by disposing the second blocking protrusion 33 and the first slope 311 in surrounding. The first blocking protrusion 32 and the second blocking protrusion 33 can be used for limiting movement of the cover plate 3. Compared with deformation of the elastic member 4 driven by the transition ridge 31 to give way to the transition ridge 31, the first blocking protrusion 32 and the second blocking protrusion 33 can directly abut against the elastic member 4, and prevent the cover plate 3 to move any more via the elastic member 4. Thus, the first blocking protrusion 32 and the second blocking protrusion 33 should have a blocking surface, which is almost perpendicular to the sliding direction of the cover plate 3 and abuts against the elastic member 4.

When the blocking surface abuts against the elastic member 4, the cover plate 3 cannot move any more. In some embodiments, along a length direction of the elastic member 4, a width of the first blocking protrusion 32, a width of the second blocking protrusion 33 and a width of the transition ridge 31 can be the same, and the adjusting slot 12 can be disposed correspondingly to the working section of the elastic member 4.

The width of the first blocking protrusion 32, the width of the second blocking protrusion 33 and the width of the transition ridge 31 being same can be not limited to absolute equal in value, but can be equality in approximate range. For example, the difference can be not greater than 25%. By such designing, limiting effects of the first blocking protrusion 32 and the second blocking protrusion 33 can be improved, and positioning effect of the transition ridge 31 can be improved.

A process for using a bracket will be described in details hereinafter in conjunction with specific components.

Referring to FIG. 1 to FIG. 10, a process for using a bracket in an embodiment is shown.

When a producer assembles the bracket, the elastic member 4 can be firstly disposed in the mounting slot 13, then the cover plate 3 can be inserted in via sliding rails disposed at a left side of the base bracket 1 and a right side of the base bracket 1, and the cover plate 3 can merely bidirectionally slide on the base bracket 1. When the cover plate 3 approaches the arch-wire slot 11, an arch surface 331 of a top surface (the top surface of the second blocking protrusion 33) can make the elastic member 4 to deform along the sliding direction of the cover plate 3, and the working section 41 of the elastic member 4 can deform and enter the adjusting slot, so as to give way to the top surface of the cover plate 3 to pass by the position that the mounting slot 13 is disposed in. The elastic member 4 can enter the second clamping slot 35, and the working section 41 of the elastic member 41 can be reset. At this time, since there is no structure capable of driving the working section 41 to give way to the cover plate 3, the cover plate 3 cannot be pulled out in a normal state, and the assembly can be completed.

When operators such as doctors need to use the bracket, the bracket can be firstly fixed to surface of teeth via the net base, then the arch-wire can be disposed in the arch-wire slot 11. The cover plate 3 can be driven to seal the arch-wire slot 11. Under driving of the second slope 312 of the transition ridge 31, the working section 41 of the elastic member 4 can deform and enter the adjusting slot 12. When the cover plate 3 completely seal the arch-wire slot 11, the elastic member 4 can be disposed correspondingly to the first clamping slot 34 and working section 41 of the elastic member 4 can reset, thereby locking the position of the cover plate 3.

When operators such as doctors need to open the bracket and adjust the arch-wire, the operator can just operate the cover plate 3 in reverse, which is not repeated herein.

Referring to FIG. 11 to FIG. 17, a process for using a bracket in another embodiment is shown.

When a producer assembles the bracket, the elastic member 4 can be firstly disposed in the mounting slot 13, then the cover plate 3 can be inserted in via sliding rails disposed at a left side of the base bracket 1 and a right side of the base bracket 1, and the cover plate 3 can merely bidirectionally slide on the base bracket 1. When the cover plate 3 approaches the arch-wire slot 11, an arch surface 331 at a top surface on the sliding direction of the cover plate 3 can drive the elastic member 4 to deform, and the working section of the elastic member 4 can deform and enter the reserved region, so as to give way to the top surface of the cover plate 3 to pass by the position that the mounting slot 13 is disposed in. The elastic member 4 can enter the second clamping slot 35, and the working section 41 of the elastic member 41 can be reset. At this time, since there is no structure capable of driving the working section 41 to give way to the cover plate 3, the cover plate 3 cannot be pulled out in a normal state. Thereafter, the sealing chock 5 can be mounted, and fixed on the base bracket 1 by methods of pasting, welding, fastening with a fastener and the like. Then, the net base 2 can be mounted on the base bracket 1.

When operators such as doctors using the bracket, the process can be the same as that above, which are not repeated herein.

The technical features of the above-described embodiments can be combined arbitrarily. In order to simplify the description, not all possible combinations of the technical features in the above embodiments are described. However, as long as there is no contradiction in the combination of these technical features, they should be considered to be within the scope of the description in this specification. When the technical features of different embodiments are embodied in a same drawing, it can be considered that the drawing also discloses the combination examples of the various embodiments involved.

The above-mentioned embodiments only represent several embodiments of the present disclosure, and the descriptions thereof are relatively specific and detailed, but should not be construed as a limitation on the scope of the patent disclosure. It should be pointed out that for one of ordinary skill in the art, without departing from the concept of the present disclosure, several modifications and improvements can be made, which all belong to the protection scope of the present disclosure. Therefore, the scope of protection of the patent of the present disclosure shall be subject to the appended claims.

We claim:

1. A bracket, comprising a base bracket provided with an arch-wire slot, a net base fixed on a first side of the base bracket, and a cover plate mounted on a second side of the base bracket, wherein
    a bottom surface of the cover plate and a top surface of the base bracket abut against each other and are in a sliding fit;
    a stripe-shaped elastic member is mounted on the top surface of the base bracket, a first clamping slot and a second clamping slot are sequentially disposed on the bottom surface of the cover plate along a sliding direction of the cover plate, and a transition ridge protruding towards the base bracket is provided between the two clamping slots; and
    the elastic member comprises a working section, when the cover plate slides, the working section enters a corresponding one of a first clamping slot and a second clamping slot via the transition ridge respectively, and an adjusting slot is further provided on the top surface of the base bracket to accommodate a deformation part of the working section when abutting against the transition ridge,
    the top surface of the base bracket is provided with a mounting slot, the elastic member is accommodated in the mounting slot, and the adjusting slot is disposed below the mounting slot and in communication with the mounting slot,
    along a length direction of the elastic member, the adjusting slot is shorter than the mounting slot, and a slope is defined at a junction between the adjusting slot and the mounting slot for transition;
    when the working section is squeezed by the transition ridge and deforms, the working section enters the adjusting slot via the slope,
    the transition ridge comprises a first slope and a second slope, the bracket has an opened state and a closed state,
    in a process of the cover plate moving to switch the bracket to the closed state, the first slope abuts against the elastic member,
    in a process of the cover plate moving to switch the bracket to the opened state, the second slope abuts against the elastic member;
    wherein a slope gradient of the first slope is smaller than that of the second slope.

2. The bracket of claim 1, wherein the mounting slot extends along a direction parallel to edges of the top surface of the base bracket.

3. The bracket of claim 1, wherein the mounting slot and the elastic member extend along a direction perpendicular to the sliding direction of the cover plate.

4. The bracket of claim 1, wherein the adjusting slot is a blind slot; or,
    the adjusting slot is a through slot, and a sealing chock is fixed at a bottom of the through slot and located at the first side of the base bracket away from the cover plate.

5. The bracket of claim 1, wherein the working section is defined as a middle part of the elastic member along a length direction of the elastic member, corresponding to the transition ridge;
    two ends of the elastic member are defined as positioning sections,
    when the cover plate slides, each of the positioning sections is limited in the mounting slot.

6. The bracket of claim 1, wherein the bottom surface of the cover plate is provided with a first blocking protrusion and a second blocking protrusion, which are disposed at both sides of the transition ridge along the sliding direction of the cover plate respectively;
    wherein the first locking protrusion is disposed at a first side of the transition ridge towards the arch-wire slot, and the second blocking protrusion is disposed at a second side of the transition ridge away from the arch-wire slot,
    wherein the first clamping slot is disposed between the first blocking protrusion and the transition ridge, when the cover plate is in a sealed position, the working section of the elastic member is accommodated in the first clamping slot;
    wherein the second clamping slot is disposed between the second blocking protrusion and the transition ridge, when the cover plate is in an opened position, the working section of the elastic member is accommodated in the second clamping slot.

7. The bracket of claim 6, wherein along a length direction of the elastic member, a width of the first blocking protrusion, a width of the second blocking protrusion and a width of the transition ridge are the same, and the adjusting slot is disposed correspondingly to the working section of the elastic member.

\* \* \* \* \*